Inventor:
William Delbert Brown
By Hofgren, Wegner,
Allen, Stellman & McCord
Attys

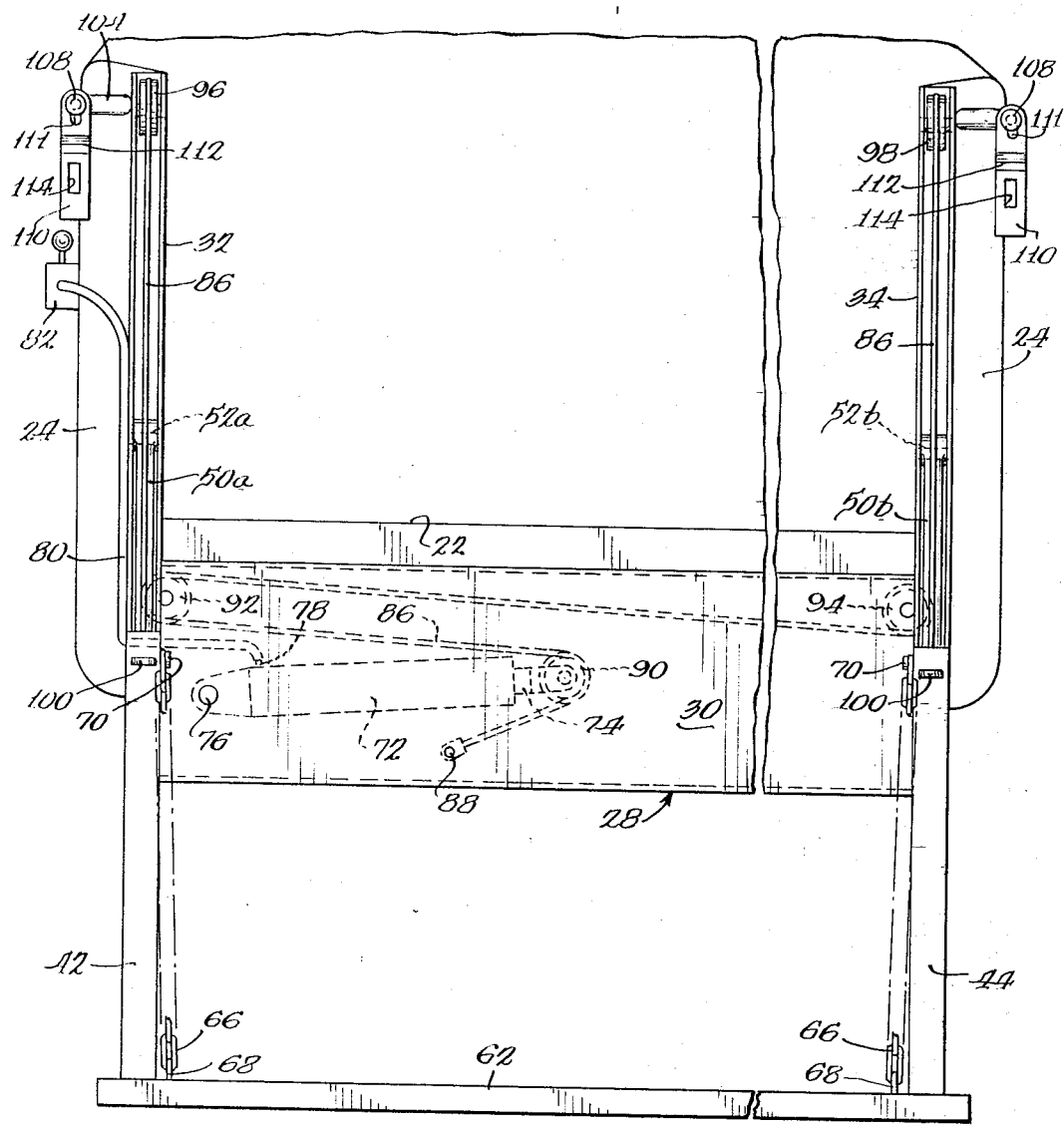

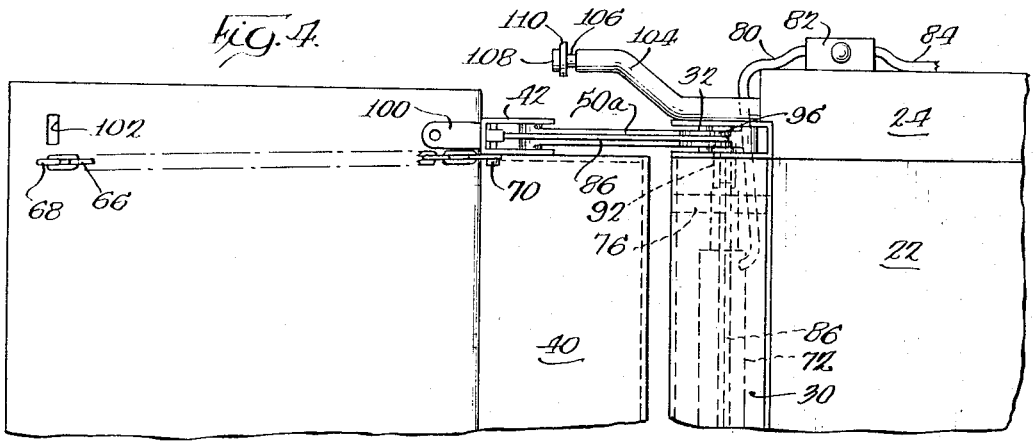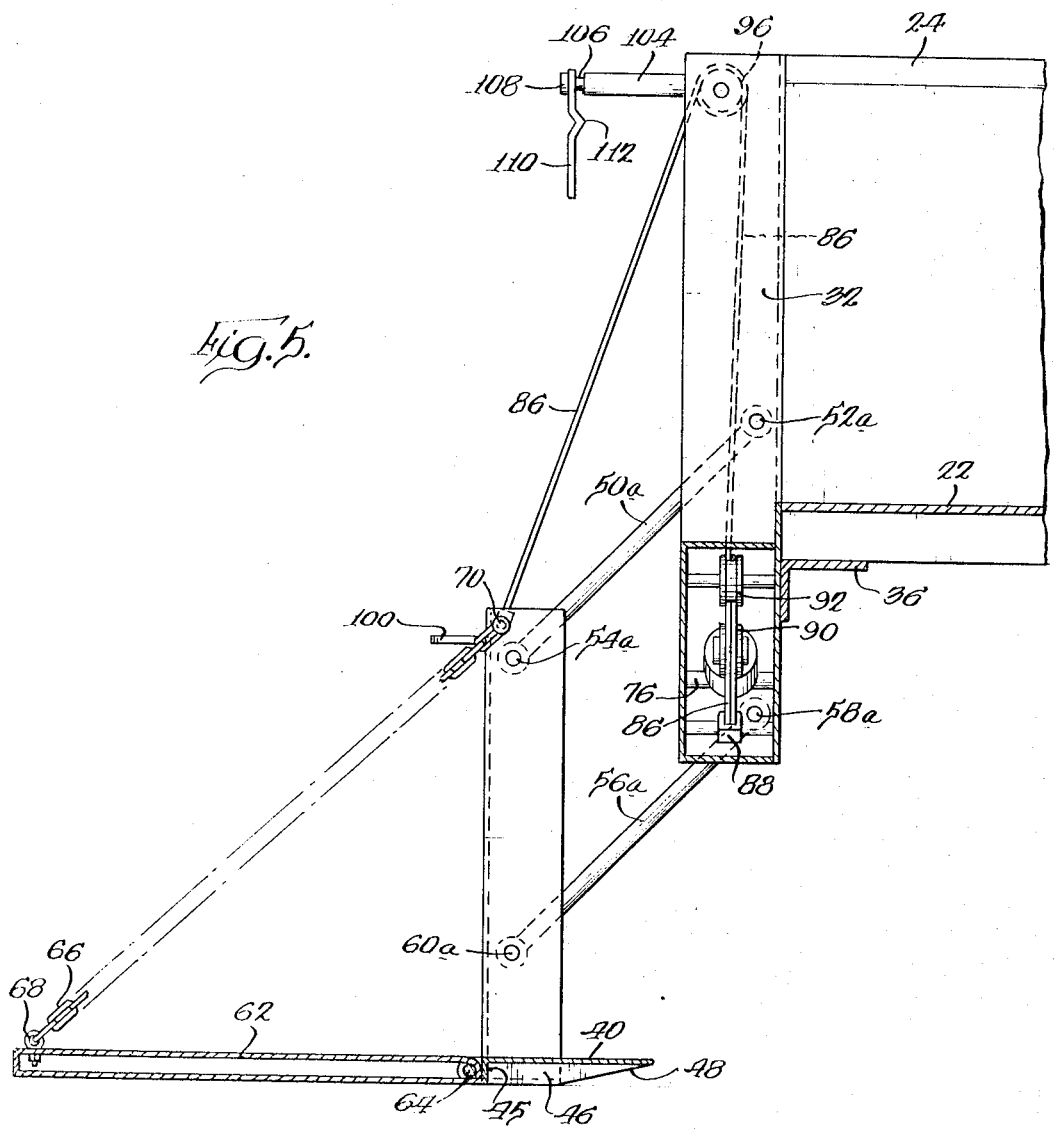

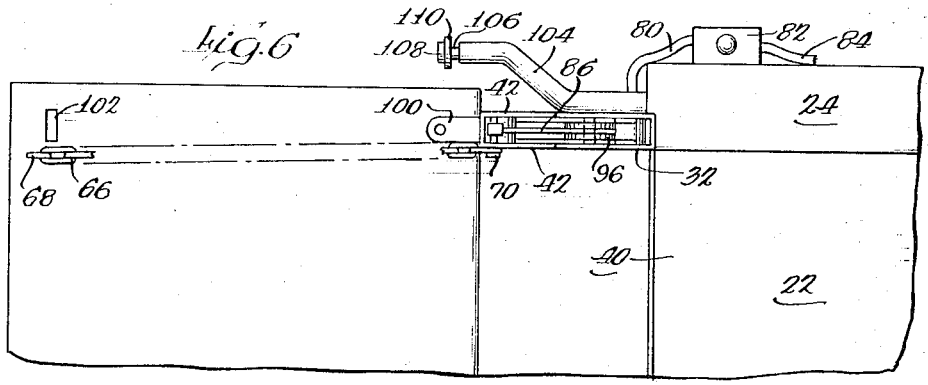
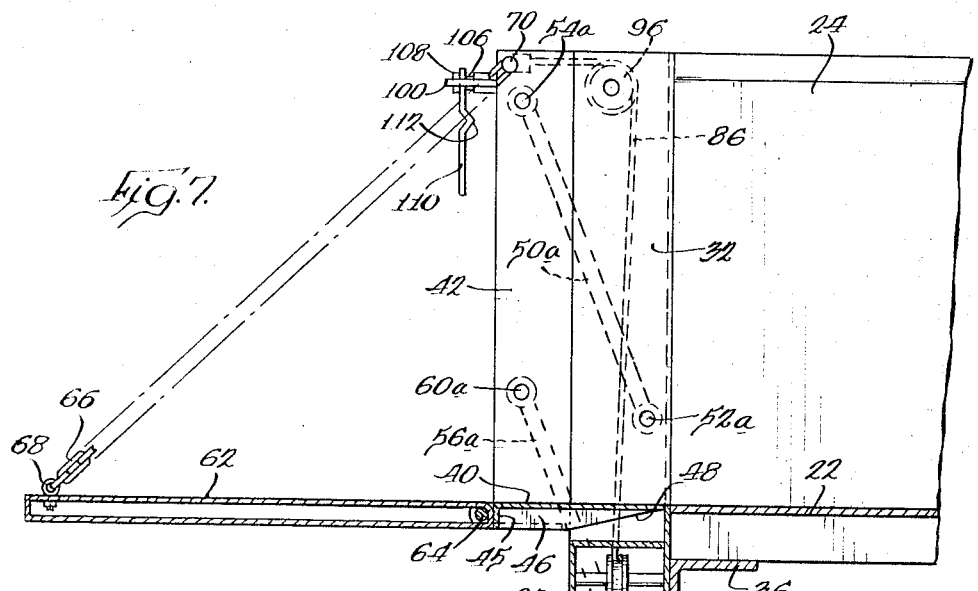
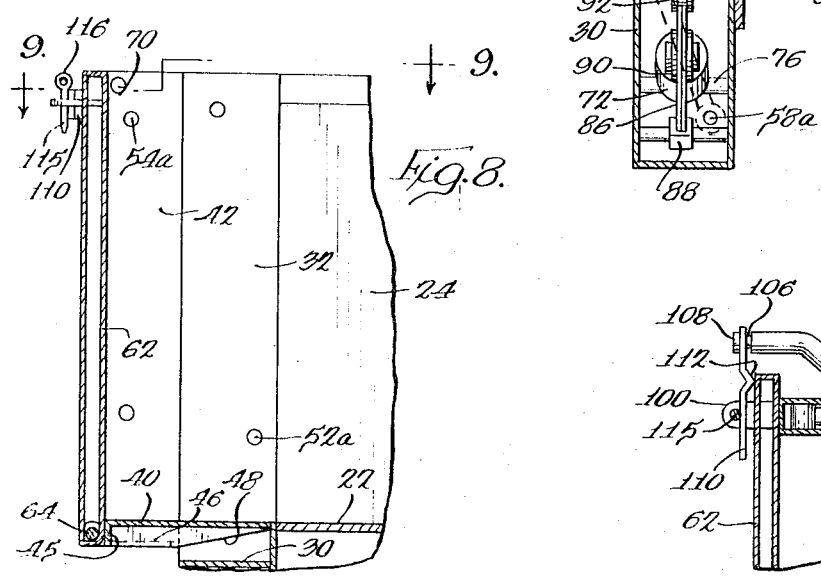
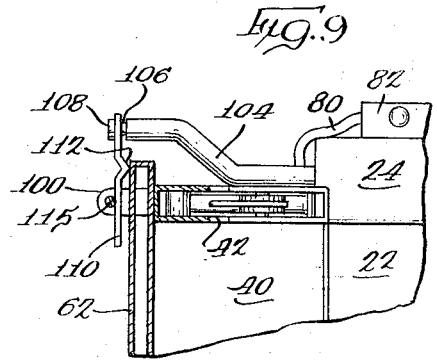

United States Patent Office 3,305,112
Patented Feb. 21, 1967

1

3,305,112
POWER LIFT GATE
William Delbert Brown, Woodbine, Iowa 51579
Filed Feb. 23, 1965, Ser. No. 434,338
6 Claims. (Cl. 214—77)

This invention relates to power lift gates for trucks and other similar vehicles.

Power lift gates currently in use on trucks, or the like, have proved to be of substantial utility. However, because of the bulkiness and design of such prior art devices which is such that their installation upon a pick-up truck would reduce the clearance between the vehicle and the roadway to a dangerous level wherein damaging interference between the roadway and the gate mechanism would be extremely likely in rough terrain or when the truck is heavily loaded, the complexity of such prior art devices and thus their substantial cost, and the large power requirements of such devices, their application has been substantially limited to use with large trucks wherein the load bed is a substantial distance, such as about five feet, above the roadway. With such a truck, roadway clearance is not a problem and the added burden of moving the load onto or off of the truck is sufficiently great so as to pay for the installation and use of a power lift gate in spite of the economic factor. But the clearance and economic factors have effectively deterred the owners of small trucks, such as pick-up trucks wherein the load bed is about three feet above the roadway from taking advantage of the reduction in the burden of loading or unloading the truck with such a gate.

It is, therefore, the principal object of the invention to provide a power lift gate of simple design and of economical construction that will find substantial utility in small trucks.

More specifically, it is an object of the invention to provide a power lift gate for a truck, or the like, having a low power requirement such that it may be operated by a power steering pump or similar device.

Another object of the invention is to provide a power lift gate in the form of an attachment whereby the gate mechanism may be easily installed on existing trucks.

Another object of the invention is to provide a power lift gate for a truck, or the like, that is substantially self-contained and that may be mounted to the rear of a truck bed or in other desired locations that will minimize modification of the truck necessary for installation.

Another object of the invention is the provision of a power lift gate for a truck wherein the operating mechanism is disposed to the rear of the truck bed so as to maximize clearance between the roadway and the operating mechanism.

Another object of the invention is the provision of a power lift gate for small trucks wherein portions of the operating mechanism are disposed above the truck bed to minimize downward projections of the mechanism below the truck bed to thereby maximize clearance between the roadway and the operating mechanism.

Other objects and advantages of the invention will be apparent from the following description taken in connection with the drawings in which:

FIGURE 3 is a rear elevation of a truck having the power lift gate in a lowered position;

FIGURE 4 is a fragmentary plan view of a truck having the power lift gate in a lowered position;

FIGURE 5 is a vertical section of a form of the invention taken approximately along the line 5—5 of FIGURE 3;

FIGURE 6 is a fragmentary plan view of a truck having the power lift gate in a raised position;

FIGURE 7 is a vertical section of the power lift gate mounted on a truck and in a raised position;

FIGURE 8 is another vertical section of the power lift gate in a raised position; and FIGURE 9 is a fragmentary section taken approximately along the line 9—9 of FIGURE 8.

Figure 1:
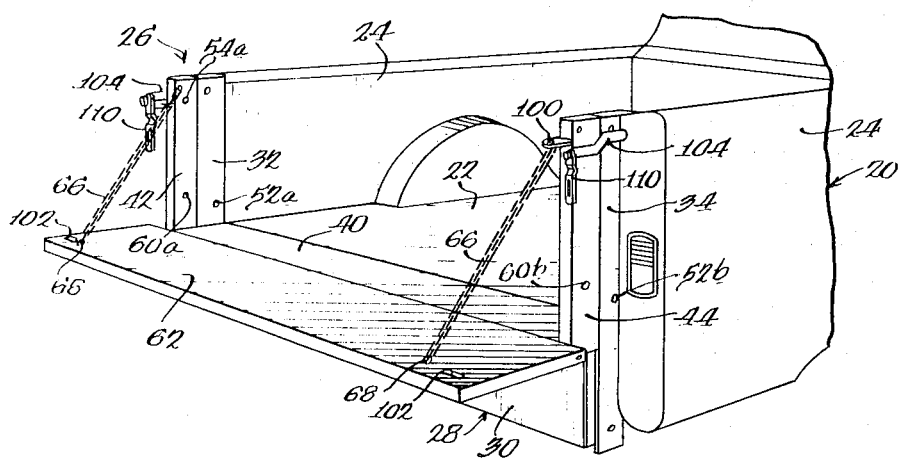
FIGURE 1 is a perspective view of a truck bearing a power lift gate, made according to the invention, in a raised position.

A conventional pickup truck, generally designated 20, is shown in FIGURE 1. The truck 20 includes a bed 22 which is adapted to carry a load and which is raised a distance of about three feet above the roadway on which the truck is to travel. A pair of parallel upright side members 24 are included in the truck construction and partially surround the bed 22.

Figure 2:
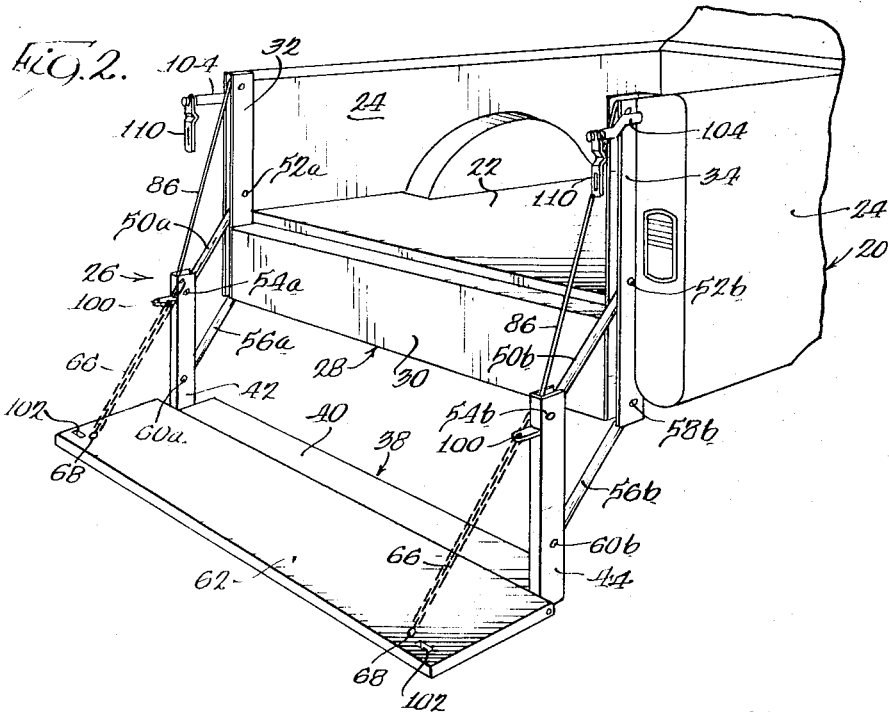
FIGURE 2 is a perspective view of a truck bearing the power lift gate in a lowered position.

As shown in FIGURE 2, an exemplary form of a lift gate made according to the invention is generally designated 26. The lift gate 26 includes a generally U-shaped housing 28 which is comprised of a base 30 and a pair of upstanding rearwardly open channel shaped leg members 32 and 34, respectively. The base 30 of the U-shaped housing 28 is secured to the end of the bed 24 by means of an angle iron or a bracket 36 (see FIGURE 5), while the legs 32 and 34 are secured to the side members 24 by suitable fastening means, not shown. The overall arrangement of the U-shaped housing 28 relative to the truck bed 22 is such that the upper surface of the of the base 30 is slightly below the upper surface of the bed 22 (see FIGURES 2 and 5) for such purposes as will be seen hereinafter.

There is also provided a U-shaped gate mount, generally designated 38, which has a shape generally conforming to that of the U-shaped housing 28. The U-shaped gate mount 38 comprises a horizontal, planar base 40 and a pair of upstanding legs 42 and 44, respectively. The upstanding legs 42 and 44 comprise channel members (as best seen in FIGURES 4 and 6) which open forwardly. As may be seen in FIGURES 7 and 8, the gate mount base 40 includes a rigidifying downturned flange 45 on the side remote from the bed 22. To further increase the rigidity of the base 40 of the gate mount 38, the gate mount base 40 is provided with end plates 46. The portion of the end plates 46 adjacent the truck bed 22 have a beveled surface 48 to enable the base 40 of the gate mount 38 to clear the upper surface of the housing base 30.

To insure proper movement of the gate mount 38 relative to the housing 30 and the bed 22, there is provided a movable connection comprising a pair of parallelogram linkages. As best seen in FIGURE 2, the parallelogram linkages comprise a pair of elongated upper links 50a and 50b. One end of the link 50a is pivotally secured at 52a within the channel shaped leg 32 of the housing 28, while the other end of the link 50a is pivotally secured at 54a within channel shaped leg 42 of the gate mount 38. The other upper link 50b is similarly pivotally connected to both the leg 34 of the housing 28 and the leg 44 of the gate mount 38 by similar pivotal connections 52b and 54b. Of course, the pivot 52a has the same pivotal axis as the pivot 52b, and the pivot 54a has the same pivotal axis as the pivot 54b.

The pair of parallelogram linkages further comprise elongated lower links 56a and 56b. The lower link 56a has one end pivotally secured within the channel shaped leg 32 of the housing 28 at 58a (see FIGURE 5) and its other end pivotally secured within the channel shaped leg 42 of the gate mount 38 at 60a. The other lower link 56b is similarly pivotally secured to both the housing leg 34 and the platform leg 44 by pivots 58b and 60b, respectively as seen in FIGURE 2. Again, the pivotal axes of the pivots 58a and 58b, and the pivots 60a and 60b are aligned. The resulting pair of parallelogram linkages permit the movement of the gate mount 38 relative to the housing 30 and truck bed 32 in such a manner that the upper surfaces of the platform bight 40 always remain in a substantially horizontal plane. This, of course, permits its use as a supporting surface for such loads as are to be put on or removed from the truck 20. The lengths of the links 50a, 50b, 56a and 56b and the placement of their pivots 52a, 52b, 54a, 54b, 58a, 58b, 60a, and 60b on the channel shaped legs 32, 34, 42 and 44 is arranged such that when that power lift gate is in its upper position, the various links are generally within the channel shaped legs 32, 34 of the housing 28 although additionally extending in a generally upward direction somewhat therefrom into the channel shaped legs 42, 44 of the gate mount 38, as seen in FIGURE 7. This feature is achieved by placing the pivots 52a, 52b, 58a, and 58b toward the lower ends of the housing legs 32, 34 and the pivots 54a, 54b, 60a and 60b somewhat away from the lower ends of the gate mount legs 42, 44.

In order to provide a horizontal area that may be used as a lifting surface, there is provided a planar tail gate 62. One side of the tail gate 62 is pivotally mounted at 64 (see FIGURES 5 and 7) to the gate mount 38 adjacent the downturned flange 45 of the base 40. To support the tail gate 62 in a horizontal position, there is provided a pair of chains 66. The chains 66 are secured to opposite corners of the tail gate 62 by eyelets 68 (see FIGURE 3). The chains 66 are also secured to the legs 42 and 44 of the gate mount 38 at the upper end of the latter by bolts 70. The length of the chains extending between the eyelets 68 and the bolts 70 is selected such that the tail gate 62 cannot rotate past the horizontal about the pivot 64. Accordingly, the tail gate 62 may be rotated between a vertical position (such as that shown in FIGURE 8) and a horizontal position (such as that shown in FIGURE 7) where it is maintained by the chains 66. It will be appreciated that by virtue of the connection of the gate 62 to the gate mount 38, the parallelogram linkages serve to maintain the gate in a fixed orientation relative to the bed 22 irrespective of the distance between the two.

While the majority of the load supporting lifting surface is provided by the gate 62, it will be appreciated that the base 40 of the gate mount 38 provides the remainder of the load lifting surface. As noted previously, the upper surface of the base 30 of the U-shaped housing 28 is placed slightly below the surface of the bed 22. By this construction, the gate mount base 40 may overlap the housing base 30 and yet be in the same horizontal plane as the bed 22 (see FIGURE 7). Accordingly, the dimension of the gate mount base 40 in a direction toward the bed 22 and the total load supporting lifting surface may be increased, while maintaining the gate mount base 40 in the plane of the bed 22, by a distance equal to about the width of the housing 28 over and above the gate mount base width that would be permissible if the upper surface of housing base 30 was placed in the same horizontal plane as the bed 22. The additional load lifting surface provided is of substantial benefit when it is necessary to move large appliances, such as refrigerators or the like. Furthermore, this increase is achieved without changing the dimensions of the tail gate 62 such that the latter, when in a vertical position, extends above the side members 24.

An actuating mechanism for raising the platform is placed within the housing 28. As seen in FIGURE 3, the actuating mechanism comprises a single acting hydraulic cylinder 72 having a piston 74. The hydraulic cylinder 72 is pivotally mounted within the housing 28 at 76. Additionally, the cylinder 72 includes an inlet port 78 which is connected by means of a conduit 80 to a control valve 82. The control valve 82 is of the three-way type and is connected to a source of hydraulic fluid under pressure (not shown), such as a power steering unit, by a conduit 84 or a motor driven pump operated from the truck battery. Additionally, the three-way valve 82 is connected through a suitable orifice, (not shown) to a fluid reservoir (not shown) for relieving the pressure exerted within the cylinder 72. Accordingly, when the valve is drawn to one position, hydraulic fluid under pressure will flow from the source into the hydraulic cylinder 72 to extend the latter. When the three-way valve 82 is drawn to its second position, the hydraulic cylinder 72 will communicate therethrough, and through the orifice, to the reservoir, thus relieving the pressure exerted within the cylinder 72.

Means are provided for transmitting the motion of the piston 74 to the gate mount 38 to raise the latter. As best seen in FIGURE 3, the motion transmitting means comprise a pair of cables 86 having one end secured to the housing 28 by suitable fastening means 88. A rotatable sheave 90 is mounted on the piston 74. Additionally another sheave 92 is mounted within the housing bight 30 adjacent the leg 32. A third sheave 94 is similarly mounted within the housing bight 30 adjacent the leg 34. Fourth and fifth sheaves, 96 and 98 respectively, are mounted in the upper ends of the channel shaped leg members 32 and 34, respectively. Both of the cables 86 are passed from the fastening means 88, around the piston mounted sheave 90 to the sheave 92. The two cables 86 diverge after passing sheave 92, one going directly to the sheave 96 and the other going to the sheave 94 and then to the sheave 98. The cables 86 are respectively strung about the sheaves 96 and 98 to the channel shaped legs 42 and 44 of the gate mount 38 and are secured to the respective legs by the bolts 70.

The operation of the lifting mechanism is as follows. When the cylinder 72 is actuated, the piston 74 moves to the right as seen in FIGURE 3, thus drawing the cables 86 into the housing 28. This results in the legs 42 and 44 of the gate mount 38, and thus the tail gate 62, being drawn upwardly to the position shown in FIGURES 1 and 7. It will be appreciated that the interposition of the pulley 90 between the piston 74 and the cables 86 provides a system having a 2:1 mechanical advantage and that for each increment of movement of the piston 74, the cables 86 will be drawn inwardly or let outwardly two such increments. Accordingly, an inexpensive cylinder having a rather short stroke may be used to provide the required movement. The gate mount 38 and the gate 62 may be easily lowered simply by directing the pressure fluid within the cylinder 72 to the reservoir and allowing the former elements to move downwardly under the influence of their own weight. The restricting action on fluid passage to the reservoir by the orifice controls the rate of gate descent.

In order to maintain the gate mount 38 in an upper position without continual actuation of the hydraulic cylinder 72, and to additionally latch the gate 62 in a vertical position, suitable locking means are provided. As the locking means used on both sides of the gate 62 are identical, only one will be described in detail. As seen in FIGURES 3, 4 and 5, the locking means comprise an apertured lug 100 affixed to the side of the channel shaped leg 42 remote from the truck bed 22 at the upper end of the former and is arranged to project through an aperture 102 in the corner of the tail gate 62 when the latter is in a vertical position. Secured to the outer side of the housing leg 32, by welding or the like, is an S-shaped bar 104. The bar 104 includes a groove 106 and a retaining head 108. A latch 110, having an elongated aperture 111 near one end thereof, is movably mounted on the bar 104 by virtue of the projection of the latter through the aperture 111. The head 108 on the bar 104 retains the latch 110 on the bar 104. The relative dimensions of the aperture 111 and the groove 106 are such as to permit a large amount of play between the latch 110 and the bar 104 to facilitate latching, as will be seen hereinafter. Additionally, the latch 110 includes an inwardly projecting portion 112, as may be seen in FIGURES 7 and 9, and a second elongated slot 114, as may be seen in FIGURE 3.

When the gate mount 38 has been raised to its uppermost position, and the gate 62 moved to a vertical position wherein the apertured lugs 100 project through the apertures 102, the latch 110 is swung about the pivot provided by its aperture 111 and the groove 106 on the bar 104 to a horizontal position, and is placed on the apertured lug 100 in such a manner that the latter projects through the second elongated aperture 114 in the latch 110. At this point, a pin 115, having an enlarged head 116, is placed within the aperture on the lug 100 and behind the latch 110 (see FIGURE 8). Accordingly, the pin 115 will preclude the latch 110 from slipping off of the apertured lug 100. The inturned projection 112 on the latch 110 will bear against the underside of the gate 62, and because of the inherent resiliency of the latch 110, some pressure will be exerted by the latter against the gate 62 to hold the latter firmly against the rear side of the platform legs 42 and 44. Since the lugs 100 are mounted on the platform legs 42 and 44, the legs 42 and 44 are effectively secured to the rods 104, and in turn, to the housings 32 and 34 and the side members 24. The gate mount 38 is thus held in its uppermost position by the locking means.

When the locking means are disengaged from the gate 62 and the gate mount 38 both will descend under their own weight until they engage the roadway. The material that is desired to be loaded into the truck 20 may then be placed on the gate 62 and the gate mount base 40, and the hydraulic cylinder 72 energized to raise the assembly. Accordingly, the gate 62 and gate mount 38 will be raised to a position such as that shown in FIGURE 7, and the load may then be shifted on to the truck bed 22. To unload the truck bed, the process just described is reversed.

From the foregoing it will be apparent that I have provided an economical and simple construction that may find substantial utility in small trucks where the bed is relatively near to the ground. It will be appreciated that such a construction will be particularly appealing to owners of small trucks and particularly those engaged in light construction, truck farming, lawn work, and other occupations wherein frequent loading and unloading of a small truck is necessary.

Having described a specific embodiment of my invention as required by 35 U.S.C. 112, I do not wish to be limited to the construction set forth, but rather, to have my invention construed according to its true spirit as set forth in the following claims.

I claim:
1. A lift gate for attachment to a vehicle having a raised bed adapted to receive a load, and upright side members, said lift gate comprising:
   (a) a U-shaped housing adapted to have its base secured to said bed and its leg secured to said side members,
   (b) a U-shaped gate mount, said gate mount generally conforming to the shape of said U-shaped housing and having a generally horizontal planar platform for supporting a load, said platform having a first edge facing said housing and a second edge spaced from said first edge and directed away from said housing,
   (c) a gate pivotally connected to said gate mount adjacent said second edge of said platform,
   (d) means connecting said gate mount to said housing for up and down movement relative thereto,
   (e) power means mounted within the base of said U-shaped housing,
   (f) motion transmitting means operatively interposed between said power means and said gate mount, and
   (g) means for selectively actuating said power means to raise or lower said gate mount.

2. A lift gate for attachment to a pickup truck having a raised, planar, horizontal bed adapted to receive a load, and upright side members, said lift gate comprising:
   (a) a housing adapted to be secured to said bed just below the plane of the latter,
   (b) a gate mount including a horizontal, planar platform having a first edge facing said housing and adapted to overlie said housing in the horizontal plane of said bed in one position of said gate mount with respect to said housing, said platform further including a second edge facing away from said housing and spaced from said first edge,
   (c) a gate movably connected to said gate mount adjacent said second edge of said platform,
   (d) means connecting said gate mount to said housing for arcuate movement between said position and a second position wherein said platform is below the plane of said bed whereby a load may be supported thereon,
   (e) movable means mounted within said housing,
   (f) motion transmitting means operatively interposed between said movable means and said gate mount, and
   (g) means for actuating said movable means to raise or lower said gate mount.

3. A lift gate for a pickup truck having a bed adapted to carry loads, and two upright side members, said power lift gate comprising: an upright channel adapted to be secured to each of said side members to face away from said bed, a pair of legs formed of channels positionable to face toward said bed and spaced apart a distance substantially equal to the distance between said channels, a gate, means connecting said gate to said pair of legs, linkage means received within said legs and said channels, means movably connecting said linkage means to said legs and said channels for movement between a first position wherein said legs are below said channels whereby a load may be easily placed on said gate and a second position wherein said legs and said channels are in substantial abutment to wholly enclose said linkage means, and means for selectively raising and lowering said gate relative to said bed.

4. A lift gate for attachment to a pick-up truck having a raised bed adapted to receive a load, said lift gate comprising:
   (a) a gate mount including a horizontal planar platform adapted to support a load and having a first edge adapted to substantially abut an end of the bed in at least one position of the gate mount with respect to the bed and a second edge spaced from said first edge,
   (b) a planar gate having a side,
   (c) means pivotally connecting said gate to said gate mount for movement between a vertical position wherein said gate is adapted to close an end of said bed and a horizontal position wherein said gate side is in substantial abutment with said second edge so that said gate is adapted to support a load in conjunction with said gate mount planar platform, and
   (d) linkage means for connecting said gate mount to said pickup truck for movement between an "up" position and a "down" position relative thereto and for maintaining said gate mount planar platform in a substantially horizontal plane for all positions intermediate said "up" and said "down" positions, whereby said gate mount planar platform will form an extension of said bed when in an "up" position and will form a movable load supporting surface with said gate in all other positions.

5. The lift gate of claim 1 wherein the legs of said housing are formed of channels facing away from said bed and the legs of said gate mount are formed of channels facing said bed, the spacing of the legs of said housing conforming to the spacing of the legs of said gate mount; and said connecting means includes linkage means having ends secured within respective ones of said channels whereby when said gate mount legs are brought into substantial abutment with the legs of said housing, said linkage means are substantially wholly enclosed within said channels.

6. A lift for attachment to a pickup truck having a raised bed adapted to receive a load, said lift comprising: a gate mount including a horizontal planar platform adapted to support a load in conjunction with a gate and having a first edge adapted to substantially abut an end of the bed in at least one position of the gate mount with respect to the bed and a second edge spaced from said first edge; means located at said second edge for pivotally connecting a planar gate to said gate mount for movement between a vertical position wherein the gate is adapted to close the end of said bed and a horizontal position wherein the gate forms a substantially continuous surface with said platform to support a load in conjunction therewith; and linkage means for connecting said gate mount to said pickup truck for movement between an "up" position wherein said platform is substantially in the plane of said bed and a "down" position relative to said bed and for maintaining said platform in a substantially horizontal plane for all positions intermediate said "up" and said "down" positions, whereby said platform will form an extension of said bed when said gate mount is in said "up" position and will form a movable load supporting surface with a gate in all other positions.

References Cited by the Examiner
UNITED STATES PATENTS

| | | | |
|---|---|---|---|
| 2,298,166 | 10/1942 | Richards | 214—77 |
| 2,527,818 | 10/1950 | Ives | 214—77 |
| 2,683,540 | 7/1954 | Wood | 214—77 |
| 3,011,664 | 12/1961 | Novotney | 214—75 |
| 3,233,758 | 2/1966 | Darfus | 214—77 |

GERALD M. FORLENZA, *Primary Examiner.*

ROBERT G. SHERIDAN, *Examiner.*